US012758907B2

(12) United States Patent
Eggum

(10) Patent No.: US 12,758,907 B2
(45) Date of Patent: Oct. 13, 2026

(54) PURGE PORT FILTER SUPPORT

(71) Applicant: ENTEGRIS, INC., Billerica, MA (US)

(72) Inventor: Shawn D. Eggum, Lonsdale, MN (US)

(73) Assignee: Entegris, Inc., Billerica, MA (US)

( * ) Notice: Subject to any disclaimer, the term of this patent is extended or adjusted under 35 U.S.C. 154(b) by 550 days.

(21) Appl. No.: 17/953,017

(22) Filed: Sep. 26, 2022

(65) Prior Publication Data

US 2023/0099075 A1 Mar. 30, 2023

Related U.S. Application Data

(60) Provisional application No. 63/249,416, filed on Sep. 28, 2021.

(51) Int. Cl.
*B01D 46/00* (2022.01)
*B01D 46/10* (2006.01)

(52) U.S. Cl.
CPC ....... *B01D 46/0005* (2013.01); *B01D 46/106* (2013.01); *B01D 2201/0415* (2013.01); *B01D 2221/14* (2013.01)

(58) Field of Classification Search
CPC .. B01D 46/0005; B01D 46/10; B01D 46/106; B01D 2201/0415; B01D 2221/14; B01D 2265/06
USPC .......................... 55/385.4, 385.6, 385.1, 501
See application file for complete search history.

(56) References Cited

U.S. PATENT DOCUMENTS

| | | | | |
|---|---|---|---|---|
| 4,113,627 A * | 9/1978 | Leason | B29C 45/1671 264/DIG. 48 |
| 4,657,570 A * | 4/1987 | Gronholz | G11B 25/043 55/501 |
| 5,230,727 A | 7/1993 | Pound et al. | |
| 6,059,861 A * | 5/2000 | Davila | B01D 17/0217 96/392 |
| 7,828,867 B2 | 11/2010 | Fox et al. | |
| 7,833,321 B2 | 11/2010 | Kawai et al. | |
| 11,530,840 B2 * | 12/2022 | Kao | B01D 46/0028 |
| 2005/0077204 A1 | 4/2005 | Sumi et al. | |
| 2012/0297981 A1 * | 11/2012 | Burns | H01L 21/67376 55/385.2 |

(Continued)

FOREIGN PATENT DOCUMENTS

| | | |
|---|---|---|
| CN | 104888551 A | 9/2015 |
| CN | 207356763 U | 5/2018 |

(Continued)

*Primary Examiner* — Amber R Orlando

(57) ABSTRACT

A front opening unified pod includes a housing and a purge port in the housing. The purge port includes a filter membrane and a purge filter support. The purge filter support includes an outer ring structure and a support frame working. The support framework extends from the outer ring structure The outer ring structure includes a plurality of supports that provide a support surface for the filter membrane. One or more of the supports respectively increase in thickness from a thickness for the upper support surface. A purge filter support includes an outer ring structure, and one or more openings, a support framework that extends from the outer ring structure. The support framework includes a supports that provide a support surface configured to contact and support a filter membrane. One or more supports each increase in thickness from a first thickness of the upper support surface.

19 Claims, 6 Drawing Sheets

(56) References Cited

U.S. PATENT DOCUMENTS

| | | | | |
|---|---|---|---|---|
| 2015/0352468 | A1 * | 12/2015 | Lin | B01D 35/303 210/335 |
| 2017/0216744 | A1 | 8/2017 | Kondo et al. | |
| 2018/0308733 | A1 | 10/2018 | Kasama et al. | |
| 2020/0161153 | A1 | 5/2020 | Babbs et al. | |
| 2020/0343117 | A1 * | 10/2020 | Eggum | H01L 21/67393 |
| 2021/0111048 | A1 | 4/2021 | Narita et al. | |
| 2023/0099075 | A1 | 3/2023 | Eggum | |

FOREIGN PATENT DOCUMENTS

| | | | |
|---|---|---|---|
| JP | 2019021735 | A | 2/2019 |
| JP | 202058852 | A | 4/2020 |
| JP | 2020058852 | A | 4/2020 |

* cited by examiner

PURGE PORT FILTER SUPPORT

PRIORITY

This disclosure claims priority to U.S. Provisional Patent No. 63/249,416 with a filing date of Sep. 28, 2021. The priority document is incorporated by reference.

FIELD

This disclosure relates to a purge port in FOUPs. More specifically, this disclosure relates to a filter support used in a purge port of FOUPs.

BACKGROUND

A semiconductor device can be manufactured from a wafer substrate. The wafer substrate, or simply wafer, undergoes a series of fabrication steps. For example, fabrication steps can include, but are not limited to, material layer deposition, doping, etching, or chemically or physically reacting material(s) of the substrate. One or more wafers can be stored and transported in a front opening unified pod ("FOUP") before, during, or after fabrication. In some fabrication steps, the wafers may be treated while still inside the FOUP. A FOUP can include one or more purge ports for supplying purge gas into the interior of the FOUP. For example, purge gas may be gas supplied to keep the interior of the FOUP at a positive pressure (e.g., above the pressure of the exterior environment, above atmospheric) while the FOUP is open.

SUMMARY

In an embodiment, a purge filter support includes an outer ring structure, a support framework, and one or more openings. The support framework extends inward from the outer ring structure. The support framework includes a plurality of supports that provide an upper support surface. The upper support surface configured to contact and support a filter membrane in a purge port of a FOUP. The supports including one or more supports that each increase in thickness from a first thickness of the upper support surface. The one or more openings extend through the support framework between the supports.

In an embodiment, a FOUP includes a housing and a purge port that extends through the housing. The purge port includes a filter membrane and a purge filter support. The purge filter support includes an outer ring structure, a support framework, and one or more openings that extend through the support framework. The outer ring structure contacts a periphery of the filter membrane. The support framework extends inward from the outer ring structure and includes a plurality of supports. The supports provide an upper support surface. One or more of the supports each respectively increases in thickness from a first thickness for the upper support surface. The flow of purge gas through the purge port pushes the filter membrane against the upper support surface.

DRAWINGS

Like numbers represent like features.

DETAILED DESCRIPTION

This disclosure relates to a purge port in FOUPs. More specifically, this disclosure relates to a filter support used in a purge port of FOUPs.

Figure 1:
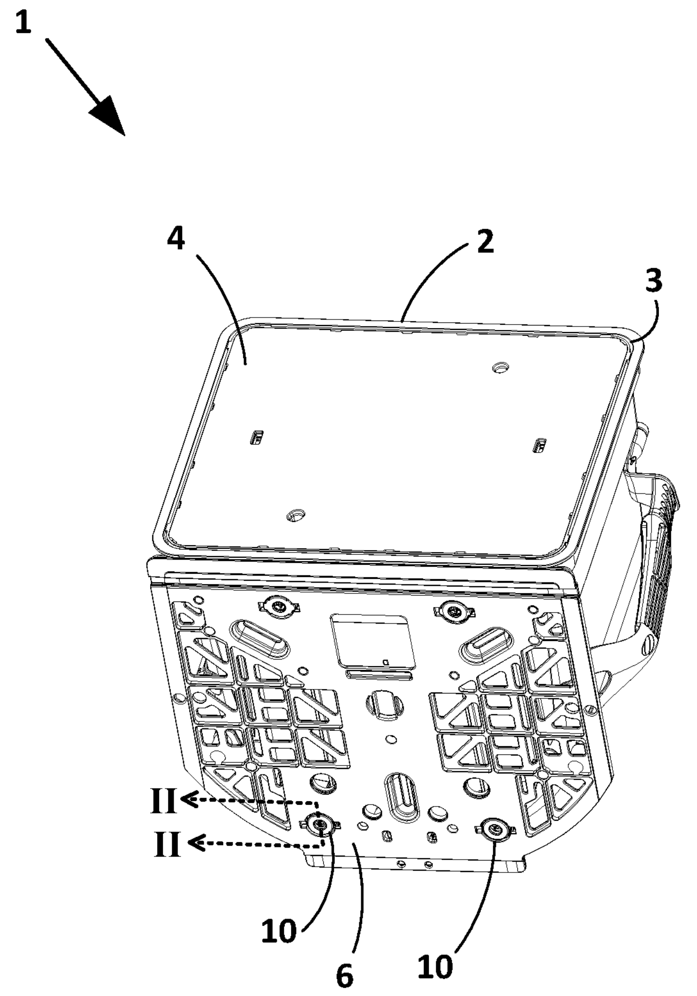
FIG. 1 is a bottom perspective view of an embodiment of a front opening unified pod (FOUP).

FIG. 1 is a bottom perspective view of an embodiment of a front opening unified pod 1 ("FOUP"). The FOUP 1 includes a housing 2. The housing 1 includes a front opening 3 and a front door 4. The door 4 covers the front opening 3 and the FOUP 1 can be accessed by moving (e.g., opening, removing) the door 4. The housing 2 includes a bottom 6 with a purge port 10. The purge port 10 extends through the housing 2. The FOUP 1 can include one or more of the purge ports 10. For example, the FOUP 1 in FIG. 1 includes two purge ports 10. In an embodiment, the FOUP 1 may include a different number of purge ports 10 (e.g., one, three, etc.).

Figure 2:
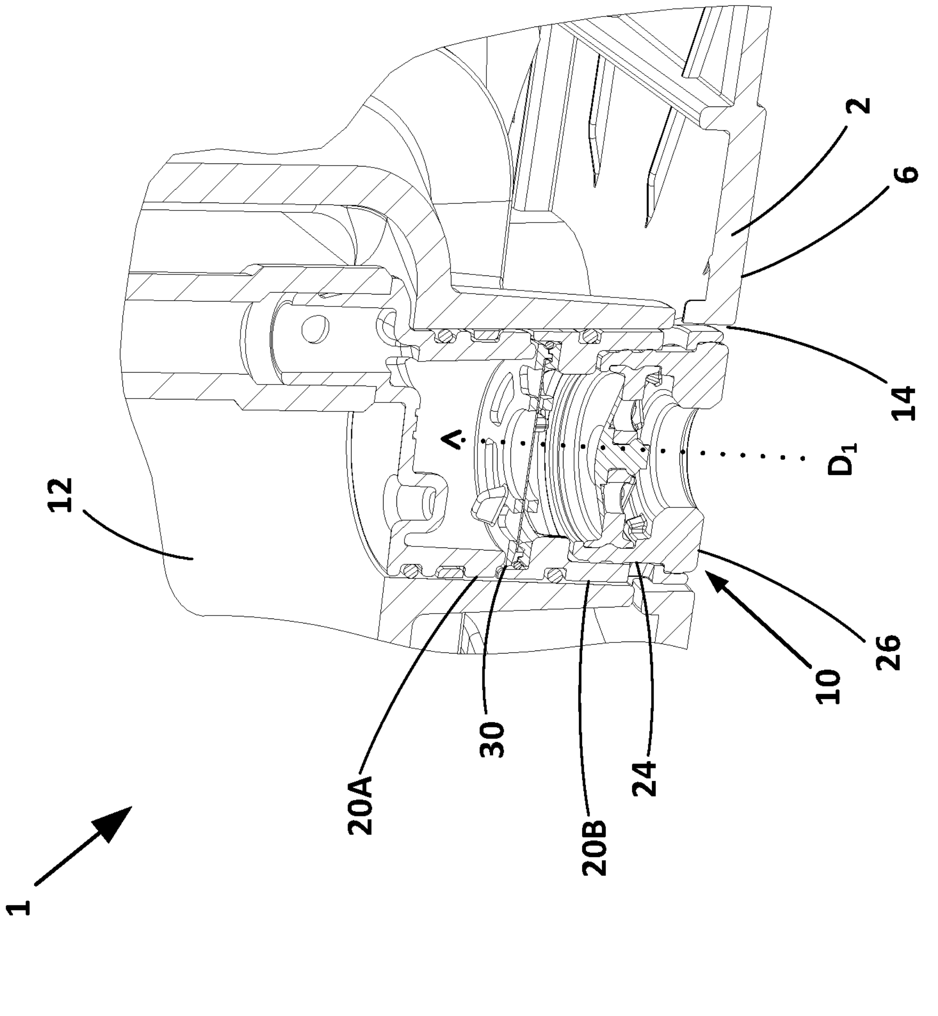
FIG. 2 is a partial cross-sectional view of the FOUP along II-II in FIG. 1, according to an embodiment.

FIG. 2 shows a partial cross-section of the FOUP 1 along the II-II in FIG. 1, according to an embodiment. FIG. 2 shows the purge port 10 of the FOUP 1. The purge port 10 is arranged in the bottom 6 of the FOUP 1. The purge port 10 is disposed in an opening 14 in the bottom 6 of the housing 2. The purge port 10 disposed in the opening 14 so as to block the opening 14 (e.g., fluid can only pass through the opening 14 by passing through the purge port 10). The purge port 10 extends through the housing 2 of the FOUP 1 to the interior space 12 of the FOUP 1.

The FOUP 1 is configured to hold one or more semiconductor substrates (not shown) within its interior space 12. In an embodiment, the FOUP is configured to hold a plurality of semiconductor substrates. The purge port 10 is for supplying purge gas into the interior 12 of the FOUP 1. For example, purge gas suppled through a purge port 10 can include, but is not limited to, generally inert gases (e.g., nitrogen), filtered air (e.g., clean dry air), etc. FIG. 2 includes a dotted arrow to indicate the general flow direction of the purge gas through the purge port 10.

As shown in FIG. 2, the purge port 10 includes an upper retaining member 20A, a lower retaining member 20B, a check valve 24, and a purge filter 30. The retaining members 20A, 20B contact the housing 2 (e.g., contact the sidewalls of the opening 14) and retain the purge port 10 within the opening 14. The check valve 24 and purge filter 30 are configured to be held in place by the retaining members 20A, 20B. In an embodiment, the purge port 10 may include a single retaining member 20A, 20B or the retaining members 20A, 20B may be a single piece. The purge gas passes through the purge filter 30 as it flows through the purge port 10. The purge filter 30 is configured to filter solid particulate from the purge gas. The purge filter 30 is discussed in more detail below.

The check valve 24 can include a grommet 26 that is configured to mate with a purge nozzle (not shown) that supplies the purge gas to the FOUP 1 and the purge port 10. The check valve 24 is configured to remain sealed at atmospheric pressure. When pressurized purge gas (e.g., having a pressure greater than atmospheric) is supplied to the purge port 10, the pressure opens the check valve 24 allowing the purge gas to flow through the purge port 10 into the interior volume 12 of the FOUP 1. In an embodiment, the purge gas flows through the purge port 10 at up to 1000 liters per minute (LPM). In an embodiment, the purge gas flows through the purge port 10 at 30-1000 LPM. In an embodiment, the purge gas flows through the purge port 10 at up to 500 LPM. In an embodiment, purge gas flows through the purge port 10 at up to 300 LPM. In an embodiment, the purge gas flows through the purge port 10 at or above 200 LPM. In an embodiment, the purge gas flows through the purge port 10 at or above 100 LPM.

Figure 3:
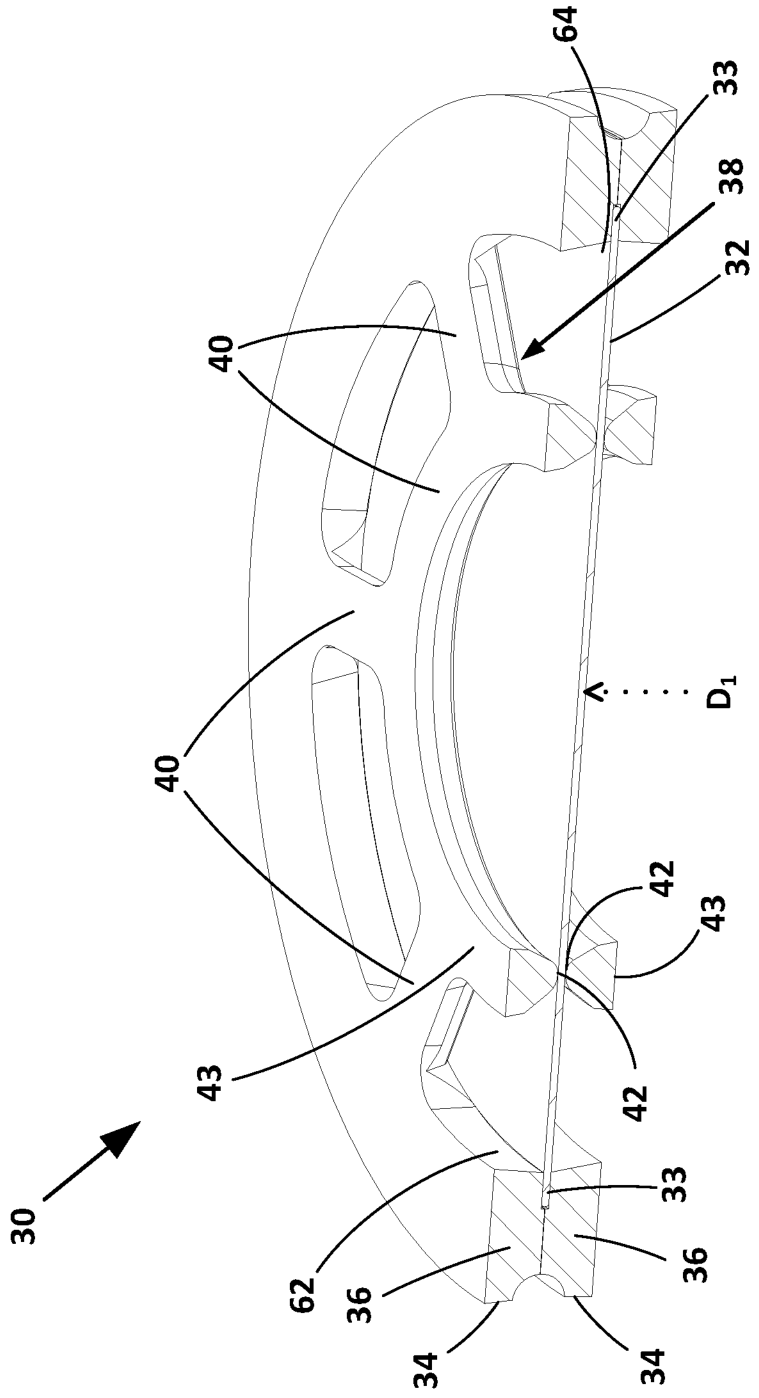
FIG. 3 is a cross-sectional view of a purge filter in the FOUP in FIG. 2, according to an embodiment.

FIG. 3 shows an enlarged view of the purge filter 30 in FIG. 2. The purge filter 30 includes a filter membrane 32 and a pair of filter supports 34. The filter membrane 32 is sandwiched between the pair of filter supports 34 in the flow direction $D_1$. Each filter support 34 includes an outer ring structure 36 and a support framework 38 that extends inwardly from the outer ring structure 36. Each outer ring structure 36 contacts the filter membrane 32. The periphery 33 of the filter membrane 32 is held between the two outer ring structures 36 of the filter supports 34. For example, the periphery 33 of the filter membrane 32 may be pinched between the two outer ring structures 36 of the filter supports 34 as shown in FIG. 3. In an embodiment, one of the filter supports 34 (e.g., the lower filter support 34 in FIG. 2) may be incorporated into the retaining portion 20B or the housing 2. It should be understood that a "ring structure" is not limited to a circular and oval shapes and includes other looped shapes such as squares, rectangular, triangles, etc.

The support framework 38 includes a plurality of supports 40. For example, the supports 40 form the support framework 38. Each filter support 34 includes an upper support surface 42 that contacts and supports the filter membrane 32. In particular, the upper support surface 42 is configured to provide support to the central portion of the filter membrane 32 through which the purge gas flows (e.g., the non-periphery inner portion of the filter membrane 32 that is not pinched between the outer ring structures 36). The flow of purge gas through the purge port 10 pushes the filter membrane 32 against the upper support surface 42 of the filter support 34. The support framework 38 also has a lower surface 43 formed by the plurality of supports 40. The lower surface 43 is deposed opposite to the upper support surface 43A on the plurality of supports.

Figure 4:
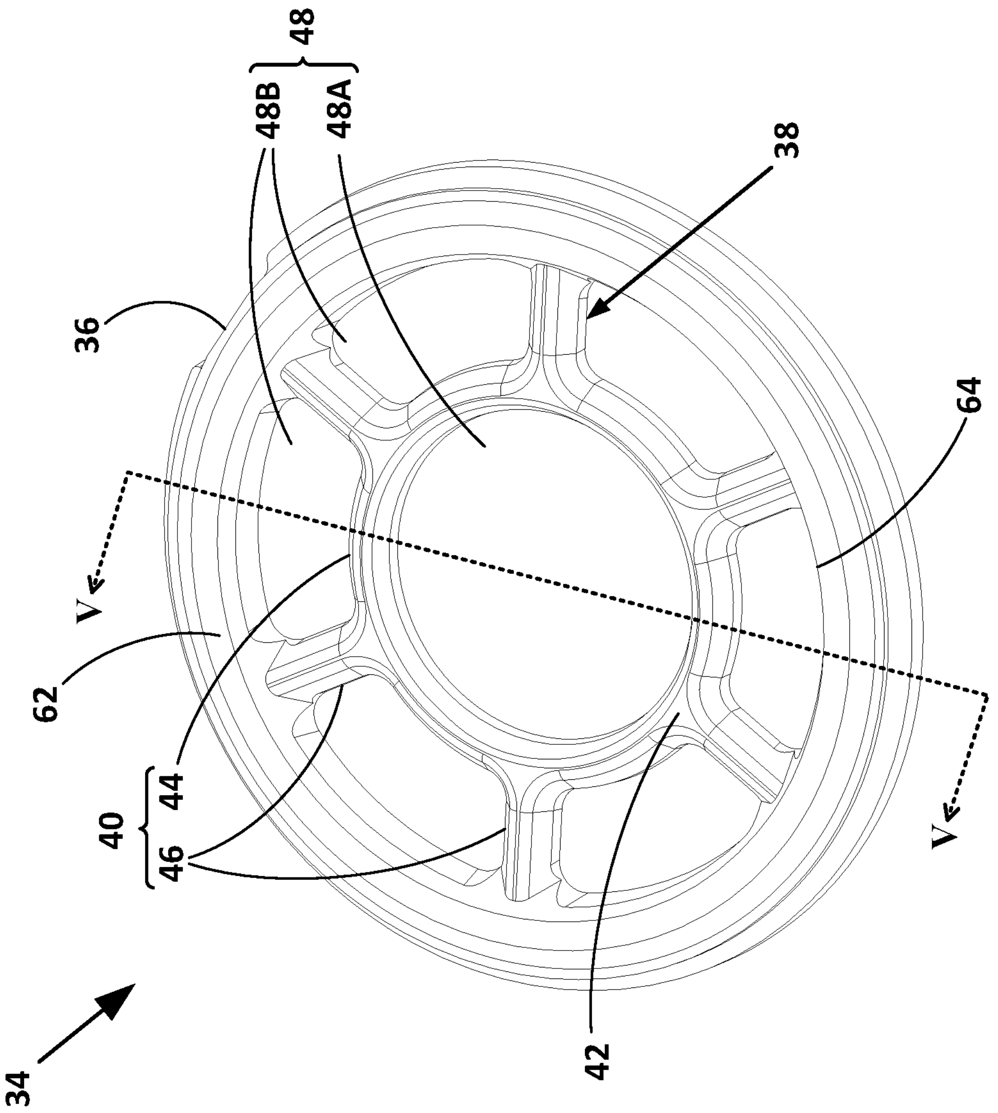
FIG. 4 is a top perspective view of an embodiment of a filter support for a purge filter in a FOUP.

FIG. 4 shows a top perspective view of a filter support 34, according to an embodiment. For example, the filter support 34 in FIG. 4 can be the upper filter support in FIG. 3. As discussed above, the filter support 34 includes an outer ring structure 36 and a plurality of supports 40 that form the support framework 38 which extends radially inward from the outer ring structure 36. The supports 40 provide the upper support surface 42 of the filter support 34. For example, each support 40 provides a portion of the upper support surface 42. Each support 40 is configured to contact the filter membrane 32 in the purge filter 30.

As shown in the illustrated embodiment, the supports 40 can include an inner ring structure 44 and ribs 46. The inner ring structure 44 and ribs 46 can form the support framework 38 as shown in FIG. 4. The inner ring structure 44 is disposed within the outer ring structure 36. The inner ring structure 44 is connected to the outer ring structure 36 by the ribs 46. Each rib 36 extends from the outer ring structure 36 to the inner ring structure 44. The outer ring structure 36 also includes one or more sidewalls 62 that define an inlet opening 64 of the filter support 34. The filter membrane 32 is disposed across the inlet opening 64.

The filter support 34 includes one or more openings 48 that extend through the support framework 38 between the supports 40. For example, the openings 48 extend through the support framework 38 by extending between at least two of the supports 40. The openings 48 allow the purge gas to pass through the filter support 34. As shown in FIG. 4, the openings 48 can include a central opening 48A that extends through the inner ring structure 44. The openings 48 can also include openings 48B that each extend through the filter support 34 in between the outer ring structure 36 and the inner ring structure 44.

As shown by FIG. 4, the overlap between the support framework 38 and the inlet opening 64 in a direction normal (e.g., in the flow direction $D_1$) to the upper support surface 42 is greater than 20%. In an embodiment, said overlap between the support framework 38 and the inlet opening 64 may be greater than 25%. In another embodiment, said overlap between the support framework 38 and the inlet opening 64 may be greater than 30%.

Figure 5:
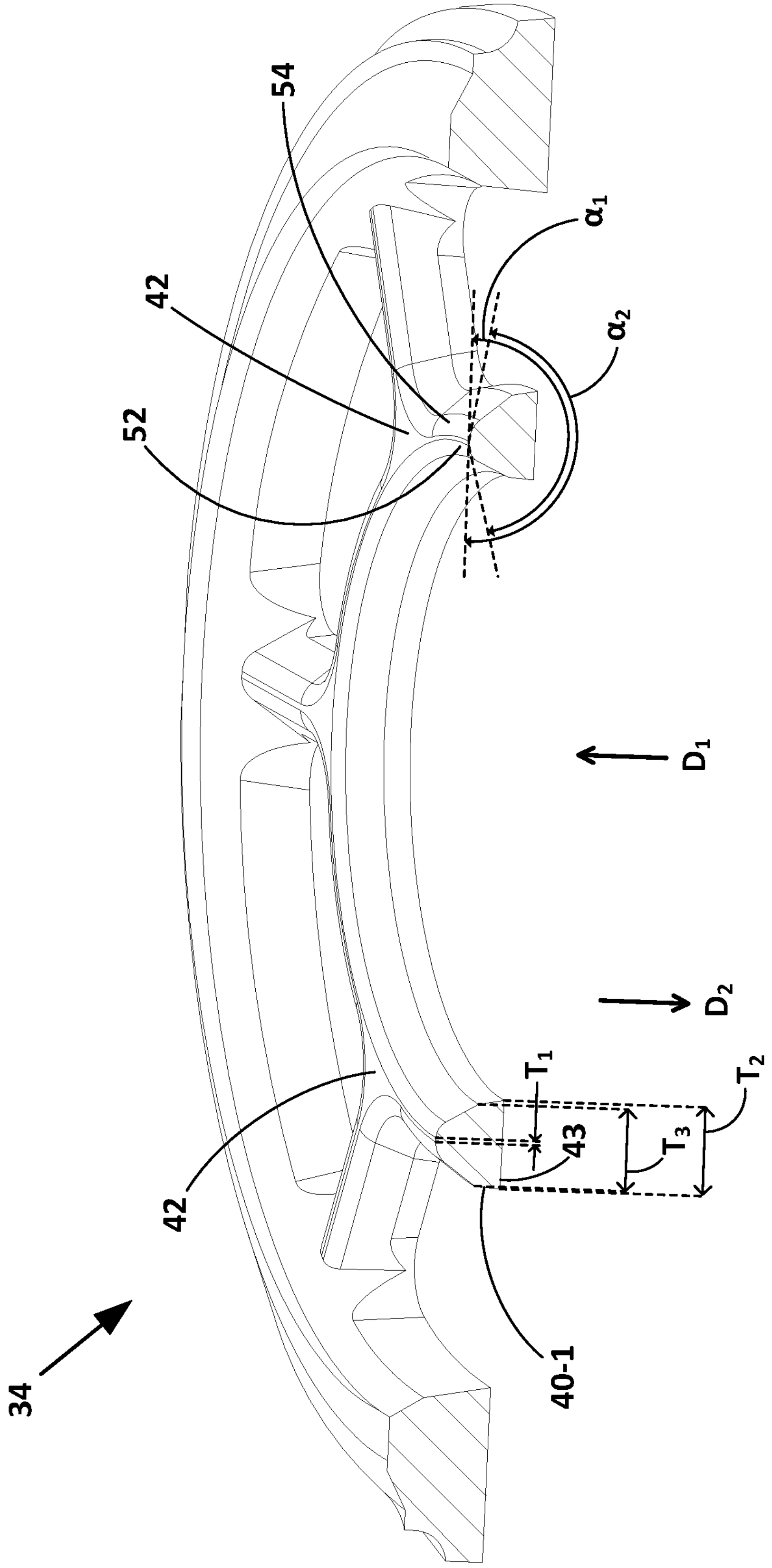
FIG. 5 is a cross-sectional view of the filter support along the line V-V in FIG. 4, according to an embodiment.

FIG. 5 shows a cross-section of the filter support 34 along V-V in FIG. 4. The plurality of supports 40 include a first support 40-1. The first support 40-1 includes the upper support surface 42 and the lower surface 43 (e.g., a portion of the upper support surface 42 and a portion of the lower surface 43). The lower surface 43 is disposed opposite to the upper support surface 42 on the first support 40-1. For example, the lower surface 43 and the upper support surface 42 disposed on opposite sides of the in the purge flow direction $D_1$. It should be understood that the "upper" and "lower" with regard to surfaces of the supports are with respect to just the filter support 34. Accordingly, the upper support surface 42 may not correspond with other relative directions/surfaces when employed in the purge port 10. For example, the upper support surface 42 faces in a downwards direction (e.g., in direction $D_2$, face in the same or similar direction to the bottom 6) and the lower surface 43 faces in an upwards direction (e.g., in direction $D_1$, face in the same or a similar direction to a top of the housing 2) in the upper filter support 34 in the purge filter 20 of FIG. 2.

As shown in FIG. 4, the thickness of the first support 40-1 varies. The thickness of the first support 40-1 varies as you proceed away from upper support surface 42 into the first support 40-1 (e.g., as you proceed in direction $D_2$ that is perpendicular to the upper support surface 42, as you proceed away from the upper support surface 42 along the purge flow direction $D_1$). Thickness of the first support 40-1 extends at or about parallel to the upper support surface 42 on the first support 40-1 (e.g., thickness is measured along a plane defined by the upper support surface 42 on the first support 40-1). For example, thickness of the first support 40 in an embodiment is measured parallel to the filter membrane 32 in the assembled purge filter 10.

The first support 40-1 has a first thickness $T_1$ for the upper support surface 42 on the support 40-1. The first thickness $T_1$ is a thickness of the first support 40-1 at the upper support surface 42. As shown in FIG. 5, the thickness of the first support 40-1 increases from the first thickness $T_1$. The first thickness $T_1$ can be 0.5 mm or less. In an embodiment, the first thickness $T_1$ may be 0.25 mm or less. In an embodiment, the first thickness $T_1$ may be 0.2 mm or less. In an embodiment, the first thickness $T_1$ may be 0.15 mm or less.

The first support 40-1 also has a second thickness that is longer than the first thickness $T_1$. The second thickness is not a thickness for the upper support surface 42. As shown in FIG. 4, the second thickness can be the thickness $T_3$ for the lower surface 43 of the first support 40-1. The second thickness $T_2$ being a thickness of the lower surface 43. In an embodiment, the second thickness may be a thickness of the first support 40-1 at a partial distance between the upper support surface 42 and the lower surface 43 (e.g., thickness $T_3$). The second thickness can be at least 1.0 mm. In an embodiment, the second thickness may be at least 1.2 mm. This second thickness $T_2$ is sufficiently large to allow for the filter support 34 to be injection molded. For example, it has been found that the higher injection pressures needed to properly inject molding a filer support with a maximum thickness $T_2$ of less than 1.2 mm results in premature hardening of the injection polymer within the injection mold. In particular, this premature hardening occurs in a substantial amount when the maximum thickness $T_2$ is less than 1.0 mm. Accordingly, the filter support 34 has is advantageously structured to be polymer injection moldable.

The area of the lower surface 43 is larger than the area of the upper support surface 42 on the first support 40-1. The upper support surface 42 on the supports 40 being larger than the area of the lower surface 43 on the supports 40 (e.g., greater than the area of the lower surface on the same supports). In an embodiment, the area of the upper support surface 42 is 85% or less of the area of the lower surface 43 (e.g., 85% or less of the area of the lower surface on the same supports). In an embodiment, the area of the upper support surface 42 is 65% or less of the area of the lower surface 43 (e.g., 65% or less of the area of the lower surface 43 on the same supports). In an embodiment, the area of the upper support surface 42 is 45% or less of the area of the lower surface 43 (e.g., 45% or less of the area of the lower surface on the same supports).

The first support 40-1 includes a first sidewall 52 and a second sidewall 54. The first sidewall 52 and the second sidewall 54 disposed opposite to each other on the first support 40-1 (e.g., disposed on opposite sides of the first support 40-1). For example, in the cross-section of the first support 40-1 shown in FIG. 5, the sidewalls 52, 54 are on opposite sides of the first support 40-1. Each of the sidewalls 52, 54 is a sidewall that extends from the upper support surface 42. For example, each sidewall 52, 54 is a sidewall that extends between the upper support surface 42 and the lower surface 43. In an embodiment, an interior angle $\alpha_1$ between the upper support surface 42 and the first sidewall 52 is greater than 90° and less than 180°. In an embodiment, the interior angle $\alpha_2$ between the upper support surface 42 and the second sidewall 54 is greater than 90° and less than 180. For example, an interior angle of 90° corresponds to a 90-degree corner in which the respective sidewall would extend perpendicular to the upper support surface.

It should be appreciated that the one or more of the other supports 40 can have similar features to those described above for the first support 40-1. In an embodiment, one or more of the supports 40 has an increasing thickness as described above for the first support 40-1. For example, the filter support 34 in an embodiment may have multiple of its supports 40 with an increasing thickness as described for the first support 40-1. In such an embodiment, the first thickness for upper supporting surface 42 may be different between different supports 40. In an embodiment, at least 50% of the supports 40 in the filter support 34 can respectively have features as described above for the first support 40-1.

The respective thickness of one or more of the supports 40 increases such that the overlap between the upper support surface 42 and the inlet opening 64 in a direction normal to the upper support surface 42 (e.g., flow direction $D_1$) is less than 20%. In an embodiment, the overlap between the upper support surface 42 and the inlet opening 64 in a direction normal to the upper support surface 42 is less than 15%. In an embodiment, the overlap between the upper support surface 42 and the inlet opening 64 in a direction normal to the upper support surface 42 is less than 10%.

The filter support 10 can advantageously allow for the upper support surface 42 to provide support to the inner portion of the filter membrane 32 disposed over the inlet opening 64 (e.g., the portion of the filter membrane not pinched by the outer ring structure 36) while only blocking a corresponding minimal amount of the filter membrane 32 (e.g., less than 20%, less than 15%, less than 10%). The thickness of the supports 40 (e.g., having the longer second thickness) can also advantageously allow for the filter support 34 to be injection molded.

When the purge gas flows through the purge port 10, a back pressure occurs as the purge gas flows through the filter membrane 32. An increase in the flow rate of purge gas through a filter membrane 32 also causes an increase in the amount of back pressure. The back pressure applies an upward force to the purge port 10 and the FOUP 1. If the back pressure becomes sufficiently high, it can lift the FOUP 10 off of the purge nozzle(s) (not shown) that respectively supply purge gas to each of the purge ports 10. The filter support 34 advantageously causes less back pressure as it blocks a minimal amount of the filter membrane 32 which results in less back pressure. The filter support 34 can achieve an advantageously lower back pressure in a purge port 10 when used with higher purge gas flow rates. For example, this allows the FOUP 10 to utilize a higher purge gas flow rate without reaching a higher back pressure that can lift the FOUP 10 off the purge nozzle(s).

Figure 6:
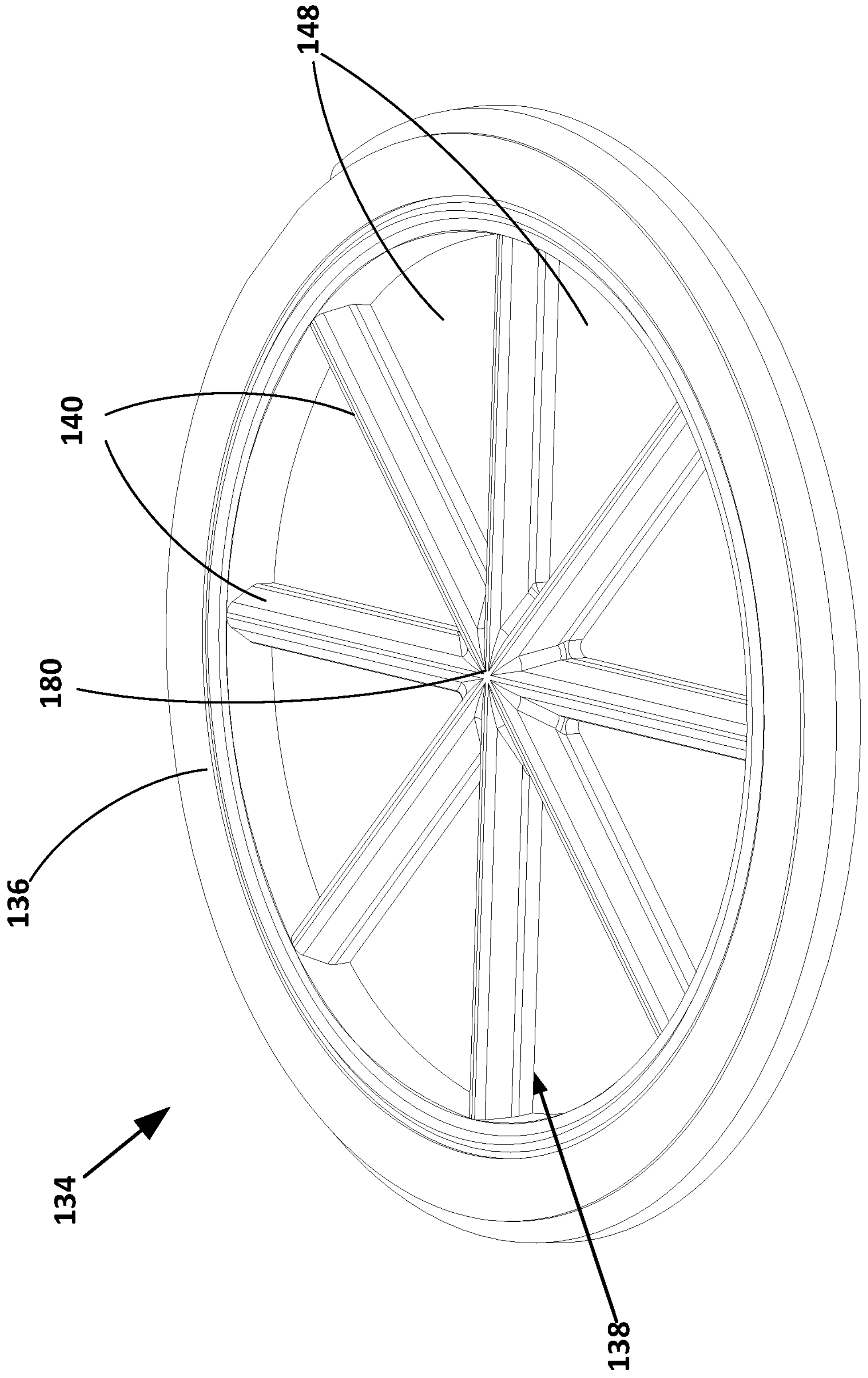
FIG. 6 is a top perspective view of another embodiment of a filter support for a purge filter in a FOUP.

FIG. 6 is a top view of another embodiment of a filter support 134. The filter support 134 is configured to be used in a purge port 10 of a FOUP 1 similar manner to the filter support 34 in FIG. 2. The filter support 134 includes an outer ring structure 136 and a support framework 138 that extends inwardly from the outer ring structure 136. The support framework 138 includes a plurality of supports 140 and openings 148 that extend through the support framework 138 between the supports 140. The filter support 134 can have a similar configuration as discussed above for the filter support 34 in FIGS. 2-5 except for the arrangement of openings 148 and supports 140 in the support framework 138.

As shown in FIG. 6, the supports 140 extend from the outer ring structure 136 inward to a middle location 180. For example, the middle location 180 can be at the center of the outer ring structure 136. Each support 140 is a rib that extends from the outer ring structure 136 to the middle location 180. Accordingly, the filter support 134 does not have a central opening (e.g., central opening 48A). The supports 140 can respectively have features as discussed above for the first support 40-1 of the filter support 34. For example, one or more of the supports 140 has an increasing thickness as similarly discussed above for the first support 40-1 in the filter support 34.

Aspects:

Any of Aspects 1-13 can be combined with any of aspects 14-19.

Aspect 1. A purge filter support, comprising: an outer ring structure; a support framework extending inward from the outer ring structure, the support framework including a plurality of supports providing an upper support surface configured to contact and support a filter membrane in a purge port of a front opening unified pod, the plurality of supports including one or more supports each increasing in thickness from a first thickness of the upper support surface;

and one or more openings extending through the support framework between the plurality of supports.

Aspect 2. The purge filter of Aspect 1, wherein for each of the one or more supports, the thickness extends at or about parallel to the upper support surface.

Aspect 3. The purge filter of any one of Aspects 1 and 2, wherein the plurality of supports includes: an inner ring structure disposed within the outer ring structure, and ribs connecting the outer ring structure to the inner ring structure.

Aspect 4. The purge filter of Aspect 3, wherein the one or more openings include a central opening that extends through the inner ring structure.

Aspect 5. The purge filter of any one of Aspects 1-4, wherein each of the one or more supports has a second thickness that is not at the upper support surface and is longer than the first thickness.

Aspect 6. The purge filter of any one of Aspects 1-5, wherein the plurality of supports includes a first support with a first sidewall extending from the upper support surface, an interior angle between the upper support surface and the first sidewall being greater than 90° and less than 180°.

Aspect 7. The purge filter of Aspect 6, wherein the first support includes a second sidewall extending from the upper support surface, an interior angle between the upper support surface and the second sidewall being greater than 90° and less than 180°, and in a cross-section of the first support, the first sidewall and the second sidewall are disposed on opposite sides of the first support.

Aspect 8. The purge filter of any one of Aspects 1-7, wherein the outer ring structure includes one or more sidewalls defining an inlet opening, and overlap between the upper support surface and the inlet opening in a direction normal to the upper support surface is less than 20%.

Aspect 9. The purge filter of any one of Aspects 1-8, wherein the outer ring structure includes one or more sidewalls defining an inlet opening, and overlap between the upper support surface and the inlet opening in the direction normal to the upper support surface is less than 10%.

Aspect 10. The purge filter of Aspect 8, wherein overlap between the support framework and the inlet opening in the direction normal to the upper support surface is greater than 20%.

Aspect 11. The purge filter of any one of Aspects 1-10, wherein the support framework has a lower surface formed by the plurality of supports, the lower surface disposed opposite to the upper support surface on the plurality of supports, and an area of the lower surface is greater than an area of the upper support surface.

Aspect 12. The purge filter of Aspect 10, wherein the area of the upper support surface is 85% or less of the area of the lower surface.

Aspect 13. The purge filter of any one of Aspects 11 and 12, wherein the area of the upper support surface is 45% or less of the area of the lower surface.

Aspect 14. A front opening unified pod, comprising: a housing; a purge port extending through the housing, the purge port including: a filter membrane, a first purge filter support that includes: an outer ring structure contacting a periphery of the filter membrane; a support framework extending inward from the outer ring structure, the support framework including a plurality of supports providing an upper support surface, the plurality of supports including one or more supports each increasing in thickness from a first thickness for the upper support surface, and one or more openings extending through the support framework between the plurality of supports, wherein a flow of purge gas flowing through the purge port is configured to push the filter membrane against the upper support surface of the support framework.

Aspect 15. The front opening unified pod of Aspect 14, wherein the purge port includes a second purge filter support including a second outer ring structure and a second support framework extending inward from the second outer ring structure, the second support framework including a plurality of second supports providing a second support surface for contacting and supporting the filter membrane, and the filter membrane is disposed between upper support surface of the first purge filter and the second support surface of the second purge filter support.

Aspect 16. The front opening unified pod of Aspect 15, wherein the periphery of the filter membrane is pinched between the outer ring structure of the first purge filter support and the second outer ring structure of the second purge filter support.

Aspect 17. The front opening unified pod of any one of Aspects 14-16, wherein the purge port includes a check valve.

Aspect 18. The front opening unified pod of any one of Aspects 14-17, wherein the outer ring structure includes one or more sidewalls defining an inlet opening, the purge gas is configured to flow through the purge filter support in a first direction, and overlap between the upper support surface and the inlet opening in the first direction is less than 10%.

Aspect 19. The front opening unified pod of Aspect 18, wherein overlap between the support framework and the inlet opening in the first direction is greater than 20%.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A purge filter configured to be assembled into a front opening unified pod purge port, the purge filter, comprising:

a filter membrane; and a purge filter support comprising:

an outer ring structure contacting a periphery of the filter membrane;

a support framework extending inward from the outer ring structure, the support framework including a plurality of supports providing a lower support surface and an upper support surface, the upper support surface contacting and supporting a central portion of the filter membrane, the plurality of supports including one or more supports each increasing in thickness from a respective first thickness of the upper support surface to a respective second thickness of the lower support surface; and one or more openings extending through the support framework between the plurality of supports, wherein the upper support surface is positioned on a downstream side of the filter membrane along a purge gas flow path through the purge filter, and is arranged to support the central portion of the filter membrane against deflection of the filter membrane in the downstream direction.

2. The purge filter of claim 1, wherein for each of the one or more supports, the thickness extends at or about parallel to the upper support surface.

3. The purge filter of claim 1, wherein the plurality of supports includes:

an inner ring structure disposed within the outer ring structure, and ribs connecting the outer ring structure to the inner ring structure.

4. The purge filter of claim 3, wherein the one or more openings include a central opening that extends through the inner ring structure.

5. The purge filter of claim 1, wherein the respective second thickness is not at the upper support surface and is longer than the respective first thickness.

6. The purge filter of claim 1, wherein the plurality of supports includes a first support with a first sidewall extending from the upper support surface, an interior angle between the upper support surface and the first sidewall being greater than 90° and less than 180°.

7. The purge filter of claim 6, wherein the first support includes a second sidewall extending from the upper support surface, an interior angle between the upper support surface and the second sidewall being greater than 90° and less than 180°, and in a cross-section of the first support, the first sidewall and the second sidewall are disposed on opposite sides of the first support.

8. The purge filter of claim 1, wherein the outer ring structure includes one or more sidewalls defining an inlet opening, and overlap between the upper support surface and the inlet opening in the downstream direction is less than 20%.

9. The purge filter of claim 1, wherein the outer ring structure includes one or more sidewalls defining an inlet opening, and overlap between the upper support surface and the inlet opening in the downstream direction is less than 10%.

10. The purge filter of claim 8, wherein overlap between the support framework and the inlet opening in the downstream direction is greater than 20%.

11. The purge filter of claim 1, wherein the support framework has the lower support surface formed by the plurality of supports, the lower support surface disposed opposite to the upper support surface on the plurality of supports, and an area of the lower support surface is greater than an area of the upper support surface.

12. The purge filter of claim 11, wherein the area of the upper support surface is 85% or less of the area of the lower support surface.

13. The purge filter of claim 11, wherein the area of the upper support surface is 45% or less of the area of the lower support surface.

14. A front opening unified pod, comprising:

a housing;

a purge port extending through the housing, the purge port including:

a filter membrane, a first purge filter support that includes:

an outer ring structure contacting a periphery of the filter membrane;

a support framework extending inward from the outer ring structure, the support framework including a plurality of supports providing a lower support surface and an upper support surface to a respective second thickness of the lower support surface, the plurality of supports including one or more supports each increasing in thickness from a respective first thickness of the upper support surface wherein the upper support surface contacts and supports a filter membrane in a purge port of a front opening unified pod, and one or more openings extending through the support framework between the plurality of supports, and a second purge filter support wherein the filter membrane is pinched between the first purge filter support and the second purge filter support, wherein a flow of purge gas flowing through the purge port is configured to push the filter membrane against the upper support surface of the support framework.

15. The front opening unified pod of claim 14, wherein the purge port includes a second purge filter support including a second outer ring structure and a second support framework extending inward from the second outer ring structure, the second support framework including a plurality of second supports providing a second support surface for contacting and supporting the filter membrane, and the filter membrane is disposed between upper support surface of the first purge filter and the second support surface of the second purge filter support.

16. The front opening unified pod of claim 15, wherein the periphery of the filter membrane is pinched between the outer ring structure of the first purge filter support and the second outer ring structure of the second purge filter support.

17. The front opening unified pod of claim 14, wherein the purge port includes a check valve.

18. The front opening unified pod of claim 14, wherein the outer ring structure includes one or more sidewalls defining an inlet opening, the purge gas is configured to flow through the purge filter support in a first direction, and overlap between the upper support surface and the inlet opening in the first direction is less than 10%.

19. The front opening unified pod of claim 18, wherein overlap between the support framework and the inlet opening in the first direction is greater than 20%.

* * * * *